United States Patent [19]
Dietz et al.

[11] Patent Number: 4,880,446
[45] Date of Patent: Nov. 14, 1989

[54] PROCESS FOR HEATING UP MOIST GASES CONTAINING HYDROGEN HALIDES

[75] Inventors: Wolfgang Dietz; Rudolf Gerken; Günter Lailach; Peter Clasen, all of Krefeld, Fed. Rep. of Germany

[73] Assignee: Bayer Aktiengesellschaft, Leverkusen, Fed. Rep. of Germany

[21] Appl. No.: 202,861

[22] Filed: Jun. 6, 1988

[30] Foreign Application Priority Data

Jun. 26, 1987 [DE] Fed. Rep. of Germany ....... 3721056

[51] Int. Cl.4 ............................................. B01D 53/14
[52] U.S. Cl. .......................................... 55/71; 55/73; 55/80
[58] Field of Search ......................... 55/71, 73, 80, 94; 110/203, 215, 216

[56] References Cited

U.S. PATENT DOCUMENTS

| | | | |
|---|---|---|---|
| 4,031,030 | 6/1977 | Rudolph | 55/80 X |
| 4,078,390 | 3/1978 | Duvall | 55/73 X |
| 4,583,999 | 4/1986 | Lindahl et al. | 55/94 X |
| 4,612,024 | 9/1986 | Muller-Odenwald | 55/80 |
| 4,617,180 | 10/1986 | Vogg | 55/71 X |

FOREIGN PATENT DOCUMENTS

| | | |
|---|---|---|
| 0208156 | 1/1987 | European Pat. Off. |
| 3217509 | 7/1983 | Fed. Rep. of Germany |
| 3329823 | 3/1985 | Fed. Rep. of Germany |

Primary Examiner—Charles Hart
Attorney, Agent, or Firm—Sprung Horn Kramer & Woods

[57] ABSTRACT

A process for heating up moist gases containing hydrogen halides comprising removing the hydrogen halides from the gases by partial condensation of the water vapor, separating out the condensate and heating up the resultant gas in indirect or recuperative heat exchangers.

10 Claims, 1 Drawing Sheet

PROCESS FOR HEATING UP MOIST GASES CONTAINING HYDROGEN HALIDES

BACKGROUND OF THE INVENTION

1. Field of the Invention

This invention relates to a process for heating up moist gases containing hydrogen halides.

2. Background Information

The heating up of moist gases which contain hydrogen halides poses great problems due to the corrosiveness of such gases, especially when the relative moisture content is so high that hydrohalic acids can be deposited as condensation on the cold walls of the apparatus and pipes. These problems occur particularly when flue gases are reheated after a process of desulphurization from which they emerge almost saturated with water vapor. Small residues of HF and HCl then cause considerable problems of corrosion.

SUMMARY OF THE INVENTION

It has surprisingly been found that the hydrogen halides can be removed much more effectively from the gas by partial condensation of the water vapor in the gas than would be possible, for example, by washing with water or with weak alkaline solutions. According to this invention, the moist gases containing hydrogen halides are cooled before they are reheated and the condensate of dilute hydrohalic acid formed is separated from the gas before the latter is reheated.

This invention therefore relates to a process for the heating up of moist gases which contain hydrogen halides, characterized in that before the gases are reheated, the hydrogen halides are removed from the gases by partial condensation of the water vapor and heating up of the gases after separation of the condensate is carried out in indirect or recuperative heat exchangers.

If removal of HCl and HF were carried out by simple washing according to the state of the art when $SO_2$ is present in the gases, the $SO_2$ would also be absorbed in the water or alkaline solution and would thereby give rise to serious problems of effluent.

BRIEF DESCRIPTION OF THE DRAWING

The FIGURE is a schematic diagram depicting the process according to the present invention.

DETAILED DESCRIPTION OF THE INVENTION

Figure 1:
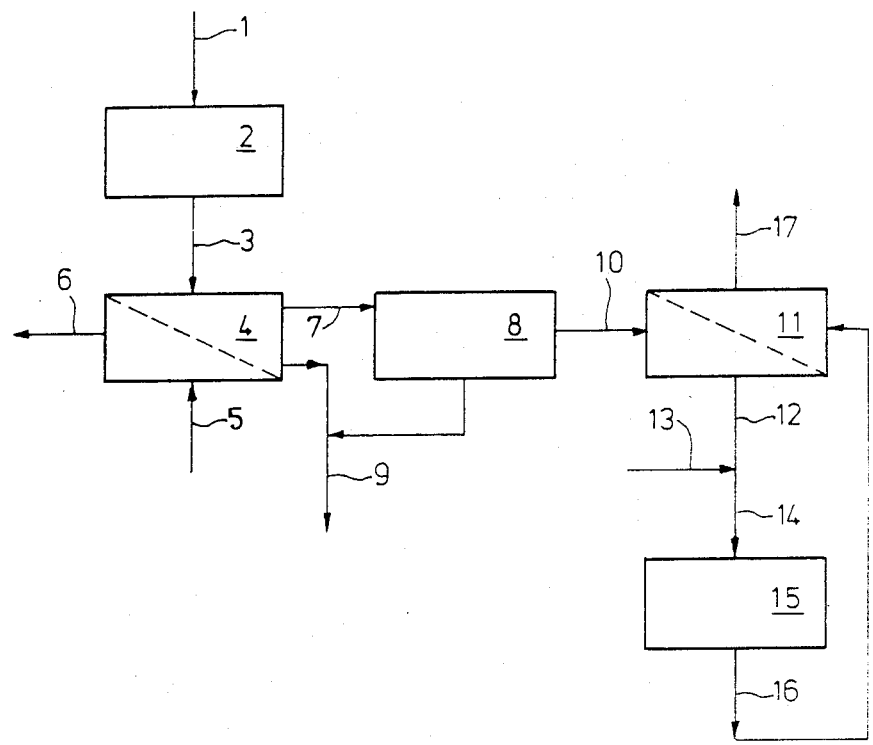

In a preferred embodiment of the process according to the invention, from 5 to 50%, preferably from 10 to 30% of the water vapor present is condensed as well as the hydrogen halides and the gases now free from hydrogen halides are heated up in heat exchangers. After the gases have been cooled, any liquid droplets contained in them are advantageously removed in mist eliminators before the gases are heated up in heat exchangers.

The gases may be cooled by indirect cooling in heat exchangers or they may be cooled directly, in which case the condensate produced by cooling may be used as a cooling agent, and the thermal energy is removed from the system by direct or indirect cooling of the condensate carried in the circulation. According to the invention, cooling of the condensate circulation may be carried out in heat exchangers or in cooling towers.

Heating up of the gases which are free from hydrogen halides may easily be carried out in recuperative or indirect heat exchangers of known types.

A preferred example of practical application of the process according to the invention is described below with reference to the FIGURE.

Flue gas (1) from coal firing is desulphurized in a wet desulphurization plant (2). The desulphurized flue gas (3) is saturated with water vapor at 40° to 60° C. and contains residues of $SO_2$, HCl and HF in addition to $NO_x$. The flue gas is cooled by 2 to 15 K. by means of cooling water (5, 6) in a heat exchanger (4). The cooled flue gas (7) is passed through a mist eliminator (8). The condensate (9) separated from the flue gas contains virtually all the HCl and HF which was present in the desulphurized flue gas (3). It is preferably fed into the desulphurization plant (2) instead of water. The flue gas (10) free from HCl and HF is heated to about 300° C. (12) in a recuperative heat exchanger or a nest of heat exchange pipes (11). Further heating by 30 to 50 K. is then carried out by means of heating gas (13) so that the flue gas (14) enters a SCR Denox (selective catalytic reduction) installation (15) at about 350° C. The purified flue gas (16) is cooled from about 350° C. to 75°–100° C. (17) in the heat exchanger (11) before it is discharged through a chimney.

The invention will now be illustrated by examples which, however, do not limit its scope.

EXAMPLE 1

Flue gas from coal firing was desulphurized in a flue gas desulphurization plant according to EP-A 177 806 with the formation of 70% sulphuric acid. The desulphurized flue gas was saturated with water vapor at 50° C. It contained 1100 mg of $NO_x$ (calculated as $NO_2$), 60 mg of $SO_2$, 5 mg of HCl and 3 mg of HF per m$^3$ (all volumes are reduced to standard conditions). The gas was cooled to 45° C. in a graphite heat exchanger. 27 g of condensate containing 0.02% of HCl and 0.005% of HF were withdrawn per m$^3$ of flue gas from the heat exchanger and the mist eliminator situated downstream of the heat exchanger. The flue gas was then found still to contain 0.2 mg of HCl and 0.6 mg of HF per m$^3$. This flue gas was then heated to 65° C. in a graphite heat exchanger and subsequently to 300° C. in a steel heat exchanger. No significant corrosion was observed in the steel heat exchanger whereas considerable corrosion was observed when the process was carried out without the removal of HCl and HF from the desulphurized flue gas in accordance with the invention, even if the flue gas was preheated to 120° C.

EXAMPLE 2

Flue gas (having the same composition as in Example 1) was brought into contact with a counter-current of condensate in a packing column, the condensate having been circulated by means of a pump and cooled from 50° C. to 44° C. in a heat exchanger. The flue gas was cooled from 50° C. to 45° C. in the packing column. After its passage through the mist eliminator, the flue gas still contained 0.1 mg of HCl and from 0.1 to 0.2 mg of HF per NM$^3$ and could easily be heated up without causing any problems.

The condensate obtained was continuously removed from the circulation of condensate.

It will be appreciated that the instant specification and claims are set forth by way of illustration and not limitation and that various modifications and changes may be made without departing from the spirit and scope of the present invention.

What is claimed is:

1. A process for heating up moist gases containing hydrogen halides comprising removing the hydrogen halides from the gases by partial condensation of the water vapor, separating out the condensate and heating up the resultant gases by indirect or recuperative heat exchangers, wherein 5 to 50% of the water vapor is condensed.

2. A process according to claim 1, wherein 5 to 50% of the water vapor is condensed.

3. A process according to claim 1, wherein 10 to 30% of the water vapor is condensed.

4. A process according to claim 1, wherein the condensation of the water vapor is conducted by the indirect cooling of the gases.

5. A process according to claim 1, wherein the condensation of the water vapor is conducted by direct cooling of the gases by means of cooled condensate carried in a cooling circulation.

6. A process according to claim 1, further comprising directing the gases to mist eliminators just prior to heating up the gases.

7. A process according to claim 1, wherein the moist gases are desulphurized flue gases from a coal firing.

8. A process according to claim 1, wherein the moist gases are saturated with water vapor at 40° to 60° C.

9. A process according to claim 1, wherein said moist gases comprise $SO_2$, $HCl$, $HF$ and $NO_x$.

10. A process according to claim 1, wherein the resultant gases are heated to 300° C. in recuperative heat exchangers.

* * * * *